United States Patent
Wang et al.

(10) Patent No.: US 11,740,483 B2
(45) Date of Patent: Aug. 29, 2023

(54) METHOD OF DIFFRACTIVE OPTICAL ASSEMBLY, AND DIFFRACTIVE OPTICAL ASSEMBLY

(71) Applicant: Hangzhou UPhoton Optoelectronics Technology Co., Ltd., Zhejiang Province (CN)

(72) Inventors: Yiyan Wang, Zhejiang Province (CN); Xiaodong Yin, Zhejiang Province (CN)

(73) Assignee: Hangzhou UPhoton Optoelectronics Technology Co., Ltd., Zhejiang Province (CN)

(*) Notice: Subject to any disclaimer, the term of this patent is extended or adjusted under 35 U.S.C. 154(b) by 0 days.

(21) Appl. No.: 17/763,474

(22) PCT Filed: Sep. 21, 2020

(86) PCT No.: PCT/CN2020/116475
§ 371 (c)(1),
(2) Date: Mar. 24, 2022

(87) PCT Pub. No.: WO2021/057651
PCT Pub. Date: Apr. 1, 2021

(65) Prior Publication Data
US 2022/0357586 A1  Nov. 10, 2022

(30) Foreign Application Priority Data
Sep. 24, 2019 (CN) .......................... 201910906655.8

(51) Int. Cl.
G02B 27/42 (2006.01)

(52) U.S. Cl.
CPC .............................. *G02B 27/4233* (2013.01)

(58) Field of Classification Search
CPC ............ G02B 27/4205; G02B 27/0012; G02B 27/0944; G02B 27/42; G02B 27/1086;
(Continued)

(56) References Cited

U.S. PATENT DOCUMENTS

| | | | |
|---|---|---|---|
| 5,496,616 | A | 3/1996 | Harris |
| 8,553,331 | B2 | 10/2013 | Stack et al. |

(Continued)

FOREIGN PATENT DOCUMENTS

| | | |
|---|---|---|
| CN | 101813797 A | 8/2010 |
| CN | 102109676 A | 6/2011 |

(Continued)

OTHER PUBLICATIONS

Chang et al (Algorithms based on rigorous coupled wave analysis for diffractive optical element design, JOSA A, vol. 18, No. 10, Oct. 2001, pp. 2491-2501, hereafter Chang). (Year: 2001).*

(Continued)

*Primary Examiner* — Jade R Chwasz
*Assistant Examiner* — Jyotsna V Dabbi
(74) *Attorney, Agent, or Firm* — Meunier Carlin & Curfman LLC

(57) ABSTRACT

A design method of a diffractive optical assembly, and a diffractive optical assembly are provided. The design method comprises: designing a first diffractive optical element according to a target light field; simulating the first diffractive optical element to obtain a first light field difference between the simulation light field of the first diffractive optical element and the target light field; and designing a second diffractive optical element according to the first light field difference.

15 Claims, 7 Drawing Sheets

(58) Field of Classification Search
CPC .......... G02B 27/4266; G02B 27/4272; G02B 27/4277; G02B 27/4233; G02B 27/10; G02B 26/08; G02B 26/0808; G02B 5/1861; G02B 5/1842; G02B 5/1847; G02B 5/0252; G02B 5/18; G02B 5/1814; G02B 5/1819; G02B 5/1866; G03F 7/70158; G01B 11/2513; G01B 11/25
USPC .......................................................... 359/558
See application file for complete search history.

(56) References Cited

U.S. PATENT DOCUMENTS

| | | | |
|---|---|---|---|
| 9,046,786 | B2 | 6/2015 | Patra et al. |
| 10,289,008 | B2 | 5/2019 | Jak |
| 2002/0085283 | A1 | 7/2002 | Hattori et al. |
| 2007/0195394 | A1* | 8/2007 | Chen .................. G03F 7/70466 359/558 |
| 2009/0185274 | A1 | 7/2009 | Shpunt |
| 2010/0284082 | A1 | 11/2010 | Shpunt et al. |
| 2012/0223218 | A1* | 9/2012 | Miyasaka .......... G02B 27/0944 359/558 |
| 2015/0346490 | A1 | 12/2015 | Tekolste et al. |
| 2016/0164257 | A1 | 6/2016 | Adachi et al. |
| 2017/0205671 | A1 | 7/2017 | Lee et al. |
| 2020/0408971 | A1* | 12/2020 | Zhu ...................... G02F 1/1333 |
| 2020/0409163 | A1 | 12/2020 | Zhu et al. |

FOREIGN PATENT DOCUMENTS

| | | |
|---|---|---|
| CN | 102763021 A | 10/2012 |
| CN | 102859440 A | 1/2013 |
| CN | 103676498 A | 3/2014 |
| CN | 103760682 A | 4/2014 |
| CN | 104793336 A | 7/2015 |
| CN | 105372826 A | 3/2016 |
| CN | 105511084 A | 4/2016 |
| CN | 105511086 A | 4/2016 |
| CN | 105911703 A | 8/2016 |
| CN | 106918906 A | 7/2017 |
| CN | 108152949 A | 6/2018 |
| CN | 208013572 U | 10/2018 |
| CN | 108919487 A | 11/2018 |
| CN | 109143607 A | 1/2019 |
| CN | 109188711 A | 1/2019 |
| CN | 109669271 A | 4/2019 |
| CN | 109814256 A | 5/2019 |
| CN | 110050233 A | 7/2019 |
| CN | 110824721 A | 2/2020 |
| JP | 2002200652 A | 7/2002 |
| JP | 2016111263 A | 6/2016 |

OTHER PUBLICATIONS

English Translation of International Search Report issued in PCT/CN2020/116475, dated Dec. 21, 2020.
Tao et al., Investigation into the design and diffraction efficiency of shifted dual transmission grating, Acta Physica Sinica, vol. 65, No. 16 2016. English Abstract.
Liming et al., Optimization Design of DOE for 2-D Diffractive Pattern, Acta Physica Sinica, vol. 27 No. 8, Aug. 1998, English Abstract.
English translation of Supplemental Search Report issued in CN2019109066558, dated Oct. 21, 2021.
English translation of First Office Action issued in CN2019109066558, dated Feb. 1, 2021.
English Translation of Search Report issued in CN2019109066558, dated Jan. 21, 2021.
English translation of Second Office Action issued in CN2019109066558, dated Jun. 30, 2021.
English translation of Decision to Grant issued in CN2019109066558, dated Nov. 2, 2021.

* cited by examiner

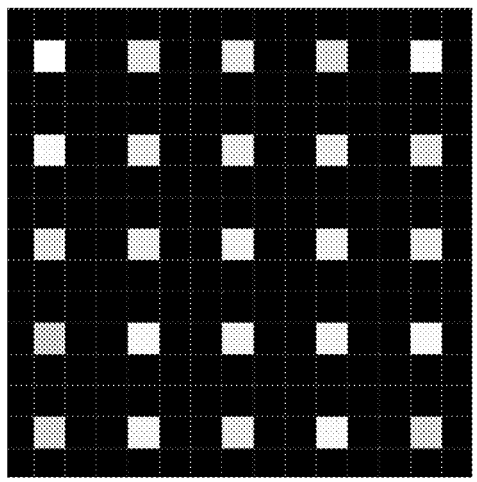
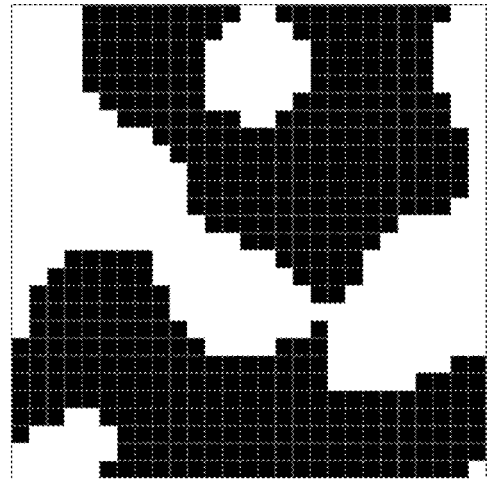
Fig. 11    Fig. 12
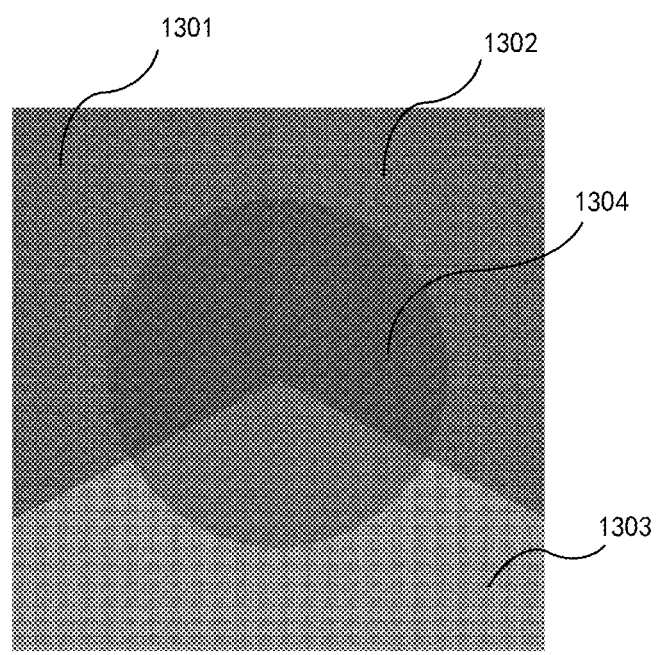
Fig. 13

METHOD OF DIFFRACTIVE OPTICAL ASSEMBLY, AND DIFFRACTIVE OPTICAL ASSEMBLY

TECHNICAL FIELD

The present disclosure generally relates to the technical field of optical device, and specifically relates to a design method of a diffractive optical assembly, and a diffractive optical assembly.

BACKGROUND ART

Diffractive Optical Element (DOE) is an optical element designed by applying the principle of diffractive optics. It usually designs a surface micro-/nano-structure for the incident laser with a particular wavelength, modulates the energy and phase of the laser, and obtains an output diffraction pattern as needed. Light splitting dot matrix is one type of Diffractive Optical Element (DOE), whose function is to divide, under the action of diffraction, a beam of incident laser into multiple beams of uniform emergent laser according to a target diffraction pattern (a regular or irregular dot matrix). Light splitting dot matrix plays a significant role in many fields, such as unmanned driving, security monitoring, and face recognition. In these fields, there are high requirements for the uniformity of DOE beam splitting. What uniformity reflects is the consistency of energy (or light intensity) between laser dots after DOE beam splitting.

Currently, the commonly used beam splitting DOE design methods can be designed according to a scalar diffraction theory or vector diffraction theory. The scalar diffraction theory is an approximation analysis method, that is, it considers only one transverse complex amplitude of the electromagnetic field component, and it is assumed that any other relevant components can be treated in the same way. The DOE analysis and design based on the scalar diffraction theory must meet the following conditions: (1) the characteristic size of the diffraction element is much larger than the wavelength; (2) the diffraction field is observed far enough from the diffraction element. When the above conditions cannot be satisfied, the vector diffraction theory needs to be adopted, whose features lie in considering the influences of the polarization characteristics of light and the interaction between different polarized lights on the diffraction results, and requiring the strict solution of the Maxwell equation set. The shortcomings of the DOE analysis and design based on the vector diffraction theory is calculation power-consuming and time-costly. Because the scalar diffraction theory is an approximation theory, it is quite different from the actual results; while the vector diffraction theory has some limitations in design due to its large amount of calculation, it is commonly used to verify the result of a scalar design. Based on these factors, as well as the influence of DOE machining error, the performance of a DOE finally obtained by designing only according to the scalar diffraction theory is often not so ideal.

The contents in the Background Art are merely the technologies known by the disclosers, and do not necessarily represent the prior art in the field.

SUMMARY OF THE INVENTION

One of the purposes of the technical solutions described in the present disclosure is to improve the performance of a DOE as designed or to provide a design method of a DOE with high performance.

In one aspect, the present disclosure provides a design method of a diffractive optical assembly, comprising:

S110: designing a first diffractive optical element according to a target light field;

S120: measuring or simulating the first diffractive optical element to obtain a first light field difference between a light field of the first diffractive optical element and the target light field; and S130: designing a second diffractive optical element according to the first light field difference.

According to one aspect of the present disclosure, the design method further comprises: combining the first diffractive optical element and the second diffractive optical element to form a first diffractive optical assembly.

According to one aspect of the present disclosure, the design method further comprises:

measuring or simulating the first diffractive optical element and the second diffractive optical element to obtain a second light field difference between a superposition light field of the first diffractive optical element and the second diffractive optical element and the target light field;

designing a third diffractive optical element according to the second light field difference;

combining the first diffractive optical element, the second diffractive optical element and the third diffractive optical element to form a second diffractive optical assembly.

According to one aspect of the present disclosure, the design method further comprises:

measuring or simulating the first to an $M^{th}$ diffractive optical element to obtain an $M^{th}$ light field difference between a superposition light field of the first to the $M^{th}$ diffractive optical element and the target light field;

designing an $(M+1)^{th}$ diffractive optical element according to the $M^{th}$ light field difference;

combining the first to the $(M+1)^{th}$ diffractive optical element to form an $M^{th}$ diffractive optical assembly, where M is a positive integer greater than 3.

According to one aspect of the present disclosure, the target light field is a uniform light splitting dot matrix, and the first light field difference is a uniformity difference.

According to one aspect of the present disclosure, the step S110 comprises: designing a phase distribution diagram of the first diffractive optical element according to a scalar diffraction theory;

the step S120 comprises: simulating the first diffractive optical element according to a vector diffraction theory to obtain the first light field difference between a simulation light field of the first diffractive optical element and the target light field.

According to one aspect of the present disclosure, the second light field difference between the superposition light field of the first diffractive optical element and the second diffractive optical element and the target light field is less than the first light field difference.

The present disclosure further relates to a diffractive optical assembly, comprising a first diffractive optical element and a second diffractive optical element as combined together, wherein the second diffractive optical element is configured to at least partially compensate for a first light field difference between a light field of the first diffractive optical element and a target light field of the diffractive optical assembly.

According to one aspect of the present disclosure, the first diffractive optical element is designed according to the target light field, and the second optical element is designed according to the first light field difference between the light field of the first diffractive optical element and the target light field.

According to one aspect of the present disclosure, the diffractive optical assembly further comprises a third diffractive optical element designed according to a second light field difference between a superposition light field of the first diffractive optical element and the second diffractive optical element and the target light field.

According to one aspect of the present disclosure, the diffractive optical assembly further comprises an $N^{th}$ diffractive optical element designed according to an $(N-1)^{th}$ light field difference between a superposition light field of the first to an $(N-1)^{th}$ diffractive optical elements and the target light field, where N is a positive integer greater than or equal to 4.

According to one aspect of the present disclosure, the target light field is a uniform light splitting dot matrix, and the first light field difference is a uniformity difference.

According to one aspect of the present disclosure, the second light field difference between the superposition light field of the first diffractive optical element and the second diffractive optical element and the target light field is less than the first light field difference.

According to one embodiment of the present invention, a diffractive optical assembly having a target light field as to be designed is formed by designing a first DOE and a second DOE having a complementary light field, and combining the first DOE and the second DOE, such that the performance of the diffractive optical assembly involved can be improved. On the analogy of this, more DOEs may be further combined. During use, a laser light source irradiates on the first DOE and the second DOE (or more DOEs), the first DOE and the second DOE (or more DOEs) modulate the incident light to form their respective target light fields, and the formed two (or more) target light fields are superimposed with each other to compose a light field more consistent with the target light field.

The features and advantages are not described in an exhaustive manner in the specification. In particular, many additional features and advantages will be obvious to those skilled in the art in view of the drawings together with the specification. Moreover, it should be noted that the terms used in this specification are mainly selected for the purpose of readability and guidance, and may not be selected to describe or limit the inventive technical solutions.

BRIEF DESCRIPTION OF THE DRAWINGS

The drawings that constitute part of the present disclosure are provided for the purpose of further understanding the present disclosure, and the exemplary embodiments of the present disclosure and description thereof are provided to explain the present disclosure, but do not make any inappropriate limitation of the same. In the drawings:

FIG. 11 illustrates a desired target light field of a third DOE to be designed by calculating in consideration of the actual light field distribution shown in FIG. 10 according to another embodiment;

FIG. 12 illustrates a schematic diagram of the phase distribution of the third DOE designed according to the target light field of FIG. 11;

FIG. 13 illustrates a schematic diagram of a laser light source irradiating on a second diffractive optical assembly formed by combined use of the first DOE, the second DOE and the third DOE according to another embodiment of the present disclosure.

DETAILED DESCRIPTION OF THE EMBODIMENTS OF THE INVENTION

Figure 1:
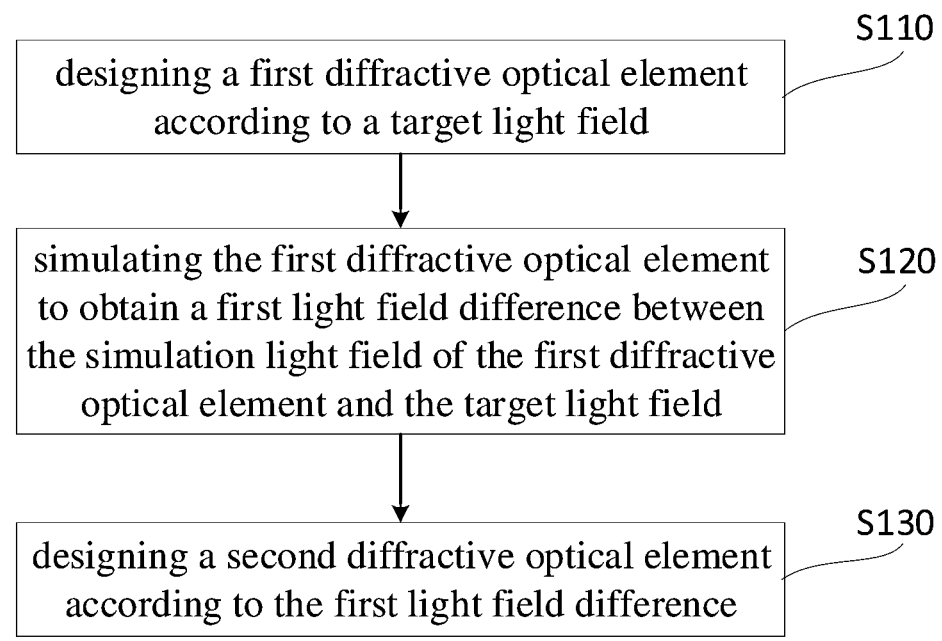
FIG. 1 illustrates a flowchart of a design method of a diffractive optical assembly according to one embodiment of the present invention.

Certain exemplary examples will be described below only in a brief manner. Just as those skilled in the art will recognize, changes in various ways to the examples described herein can be carried out without departing from the spirit or scope of the present disclosure. Therefore, the drawings and the following description are deemed essentially exemplary, instead of limitative.

Referring now in detail to several embodiments of the present invention, the typical examples thereof are shown in the drawings. It should be noted that similar or identical reference signs, as long as feasible, may be adopted in the drawings, and may be used to indicate similar or identical functions. The drawings describe several examples of the present invention for the illustrative purposes only. Those skilled in the art will readily recognize from the following description that alternative examples of the structures and methods described herein can be used without departing from the principles of the examples described herein. As long as feasible, the method steps described below may not be performed in an order as illustrated.

The flowcharts and block diagrams in the drawings illustrate the system structures, functions and operations that may be achieved by the devices, methods and computer program products according to various examples of the present invention. In this regard, each block in the flowcharts or block diagrams may represent a module, a program segment, or part of a code, the module, the program segment, or part of the code containing one or more executable instructions for implementing predetermined logical functions. It should be noted that in some alternative implementations, the functions marked in the blocks may also take place in an order different from those marked in the drawings. For example, two blocks listed in a successive manner can actually be executed basically in parallel, or sometimes in the opposite order, which depends on the functions involved. It should also be noted that each block in the block diagrams and/or flowcharts, and the combination of blocks in the block diagrams and/or flowcharts may be implemented by a dedicated hardware-based system for performing a specified function or operation, or by a combination of dedicated hardware and computer instructions.

In the description of the present disclosure, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and are used only for the purpose of facilitating description of the present disclosure and simplification of the description, instead of indicating or suggesting that the denoted devices or elements must be oriented specifically, or configured or operated in some specific orientation. Thus, such terms should not be construed to limit the present disclosure. In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the present disclosure, "plurality" means two or above, unless otherwise defined explicitly and specifically.

In the description of the present disclosure, it needs to be noted that, unless otherwise specified and defined explicitly, such terms as "mount" "link" and "connect" should be understood as generic terms. For example, connection may refer to fixed connection, dismountable connection, or integrated connection; also to mechanical connection, electrical connection or intercommunication; further to direct connection, or connection by an intermediary medium; or even to internal communication between two elements or interaction between two elements. For those skilled in the art, they can construe the specific meaning of such terms herein in light of the specific circumstances.

Herein, unless otherwise specified and defined explicitly, if a first feature is "above" or "below" a second one, this may cover the direct contact between the first and second features, also cover the contact via another feature therebetween, instead of the direct contact. Furthermore, if a first feature "above", "over" or "on the top of" a second one, this may cover the case that the first feature is right above or on the inclined top of the second feature, or just indicate that the first feature has a horizontal height higher than that of the second feature. If a first feature is "below", "under" or "on the bottom of" a second feature, this may cover the case that the first feature is right below and on the inclined bottom of the second feature, or just indicates that the first feature has a horizontal height lower than that of the second feature.

The disclosure below provides many different embodiments and cases so as to realize different structures described herein. In order to simplify the disclosure herein, the following will give the description of the parts and arrangements embodied in specific cases. Surely, they are just for the exemplary purpose, not intended to limit the present disclosure. Besides, the present disclosure may repeat a reference number and/or reference letter in different cases, and such repeat is for the purpose of simplification and clarity, which does not represent any relation among various embodiments and/or arrangements as discussed. In addition, the present disclosure provides examples of various specific techniques and materials, but those skilled in the art can also be aware of application of other techniques and/or use of other materials.

The preferred examples of the present disclosure will be introduced below referring to the drawings. It should be appreciated that the preferred examples described herein are only for the purpose of illustrating and explaining, instead of restricting, the present disclosure.

FIG. 1 illustrates a flowchart of a design method 100 of a diffractive optical assembly according to one embodiment of the present invention. A detailed description will be made below with reference to FIG. 1.

As shown in FIG. 1, the design method 100 according to this embodiment comprises the following steps.

In step S110, a first diffractive optical element (DOE) is designed according to a target light field. The target light field may be a desired target light field of the diffractive optical assembly to be designed.

In step S120, a first light field difference between a light field of the first diffractive optical element and the target light field is obtained by measuring or simulating the first diffractive optical element. The light field of the first diffractive optical element obtained here may be an actual light field obtained by actually measuring the first diffractive optical element that is produced or manufactured, or a simulation light field obtained by simulating the first diffractive optical element that is designed.

In step S130, a second diffractive optical element is designed according to the first light field difference.

At the time of designing a DOE according to a desired target light field, the actual light field formed by the designed DOE in specific use usually has more or less deviation from the desired target light field due to the precision of the DOE and the complexity in the DOE design. In some cases, the deviation is relatively large. For example, when a light splitting dot matrix is achieved through DOE design, the deviation of uniformity between light dots is relatively large. According to the above embodiment of the present invention, the first DOE is initially designed according to the desired target light field, then the first DOE is measured or simulated to obtain the light field difference between the light field of the first DOE and the desired target light field, and the second DOE is designed according to the light field difference. In use, the first DOE and the second DOE complementary thereto can be combined to eliminate, to the largest extent, the light field difference between the actual light field of the formed diffractive optical assembly and the desired target light field, or make the former approximate the latter as much as possible. By combining the first diffractive optical element (first DOE) and the second diffractive optical element (second DOE) for use, the diffractive optical assembly to be designed can be obtained, and the difference between the light field generated by the obtained diffractive optical assembly and the desired target light field is further reduced.

Figure 2:
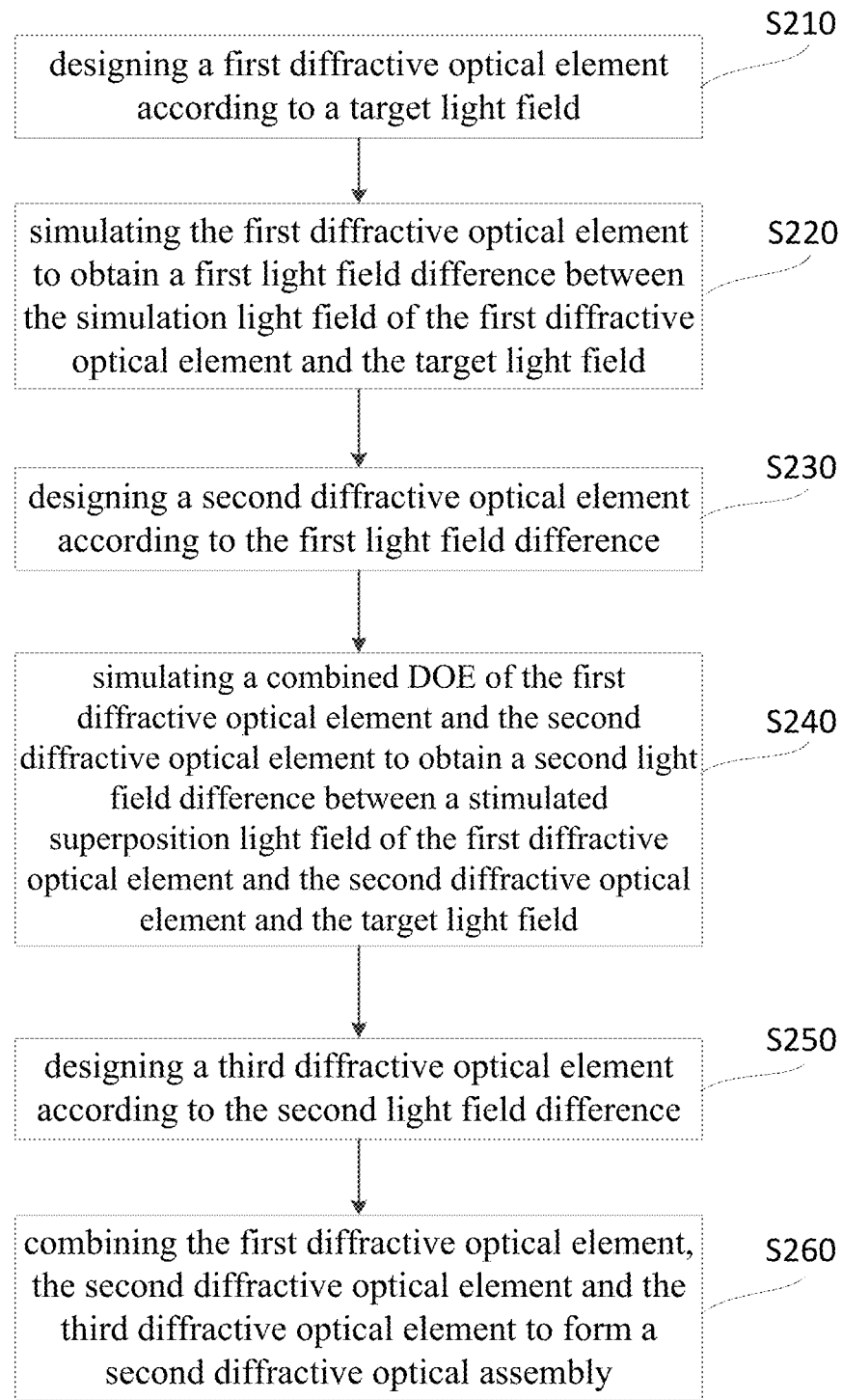
FIG. 2 illustrates a flowchart of a design method of a diffractive optical assembly according to another embodiment of the present invention.

FIG. 2 illustrates a flowchart of a design method 200 of a diffractive optical assembly according to another embodiment of the present invention. With reference to FIG. 2, the method 200 comprises the following steps.

In step S210, a first diffractive optical element is designed according to a target light field.

In step S220, a first light field difference between a light field of the first diffractive optical element and the target light field is obtained by measuring or simulating the first diffractive optical element. The light field of the first diffractive optical element obtained here may be an actual light field obtained by actually measuring the first diffractive optical element that is produced or manufactured, or a simulation light field obtained by simulating the first diffractive optical element that is designed.

In step S230, a second diffractive optical element is designed according to the first light field difference.

In step S240, a second light field difference between a superposition light field of the first diffractive optical element and the second diffractive optical element and the target light field is obtained by measuring or simulating a combined DOE of the first diffractive optical element and the second diffractive optical element. Similar to the step S220, the superposition light field of the first diffractive optical element and the second diffractive optical element obtained here may be an actual light field obtained by actually measuring the combined DOE of the first diffractive optical element and the second diffractive optical element that is produced or manufactured, or a simulation light field obtained by simulating the first diffractive optical element and the second diffractive optical element that are designed.

In step S250, a third diffractive optical element is designed according to the second light field difference.

In step S260, the first diffractive optical element, the second diffractive optical element and the third diffractive optical element are combined to form a second diffractive optical assembly.

The steps S210, S220 and S230 in the method 200 are substantially the same as the steps S110, S120 and S130 in the method 100, and will not be repeated here. By the steps S240, S250 and S260, measurement or simulation is carried out for the first diffractive optical assembly formed by combination of the first DOE and the second DOE to obtain the light field difference between the light field of the first diffractive optical assembly and the desired target light field, and the complementary third DOE is designed with regard to the light field difference. The first DOE, the second DOE and the third DOE are combined to form a second diffractive optical assembly, and the actual light field of the second diffractive optical assembly further approximates the target light field. The second light field difference between the superposition light field of the first diffractive optical element and the second diffractive optical element and the target light field is generally less than the first light field difference.

Further, an $M^{th}$ light field difference between a superposition light field of the first to an $M^{th}$ diffractive optical element and the target light field is obtained by measuring or simulating the first to the $M^{th}$ diffractive optical element. An $(M+1)^{th}$ diffractive optical element is designed according to the $M^{th}$ light field difference. The first to the $(M+1)^{th}$ diffractive optical element are combined to form an $M^{th}$ diffractive optical assembly. M is a positive integer greater than 3. For example, the second diffractive optical assembly can be further measured or simulated to obtain a light field difference between the actual light field of the diffractive optical assembly and the desired target light field, and a complementary fourth DOE can be designed with regard to the light field difference. Thus, a diffractive optical assembly further approximating the target light field can be obtained.

Example I

Figure 3:
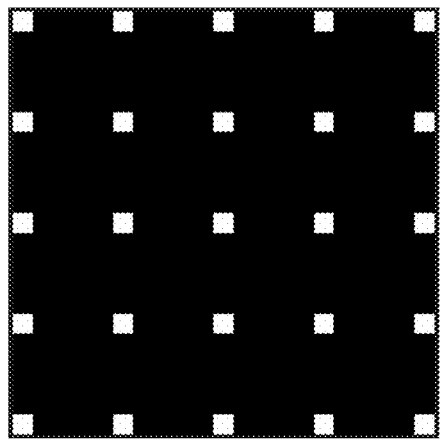
FIG. 3 illustrates a schematic diagram of a target light field of a DOE desired to be designed according to one embodiment.

It is desired to design a target light field that is a matrix of 5×5 uniformly distributed dots. As shown in FIG. 3, it illustrates a target light field of a DOE desired to be designed according to Example I.

Figure 4:
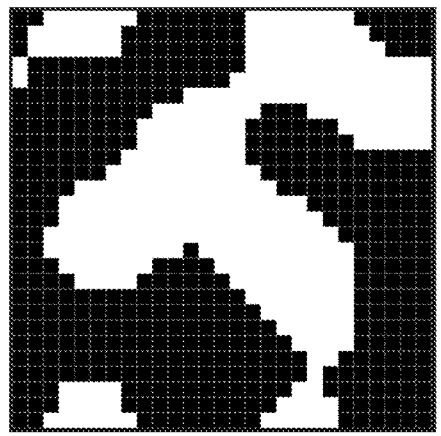
FIG. 4 illustrates a schematic diagram of the phase distribution of the first DOE designed according to the target light field of FIG. 3.

According to the target light field shown in FIG. 3, the phase distribution of the first DOE can be calculated, and thereby the first DOE can be designed (or manufactured). As shown in FIG. 4, it illustrates a schematic diagram of the phase distribution of the first DOE according to Example I. The phase distribution of the DOE can be calculated by a scalar diffraction theory.

Figure 5:
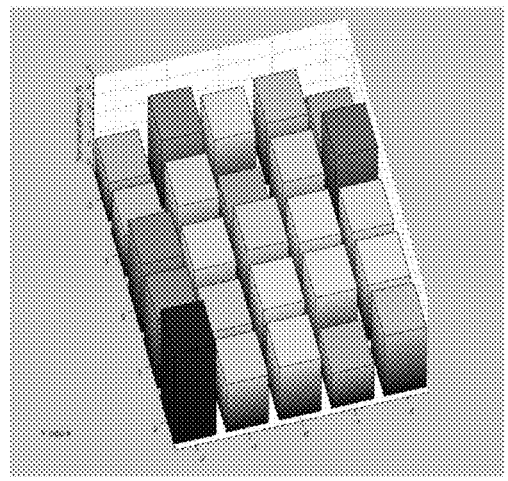
FIG. 5 illustrates a schematic diagram of the actual light field distribution of the first DOE designed according to the target light field of FIG. 3.

An actual light field distribution of the first DOE can be obtained by performing vector simulation for the phase distribution diagram of the first DOE, for example by employing Rigorous Coupled Wave Analysis (RCWA). However, the present invention is not limited to this, and the actual light field of the first DOE can also be obtained by producing and manufacturing the designed first DOE and then performing actual measurement. As shown in FIG. 5, it illustrates a schematic diagram of the actual light field distribution of the first DOE according to Example I. As shown in FIG. 5, it can be seen that there is a large difference in light intensity at each dot therein.

In the actual light field distribution shown in FIG. 5, a certain gap exists between the light field energy distribution of the first DOE and the uniform target light field. The uniformity of light field distribution can be expressed by a uniformity error. For the light intensity value of each dot obtained by DOE vector simulation, the uniformity error can be calculated by the following formula:

Uniformity Error=(Maximum Light Intensity Value−Minimum Light Intensity Value)/(Maximum Light Intensity Value+Minimum Light Intensity Value)

In the actual light field distribution shown in FIG. 5, the uniformity error actually calculated is about 48%.

It is desired to design a diffractive optical assembly having light fields consistent in uniformity. Therefore, when the second DOE is designed, the desired target light field thereof can offset the uniformity difference in the light field energy distribution of the first DOE. Then ideally, a diffractive optical assembly formed by combining the first DOE and the second DOE can produce a desired target light field as shown in FIG. 3.

Figure 6:
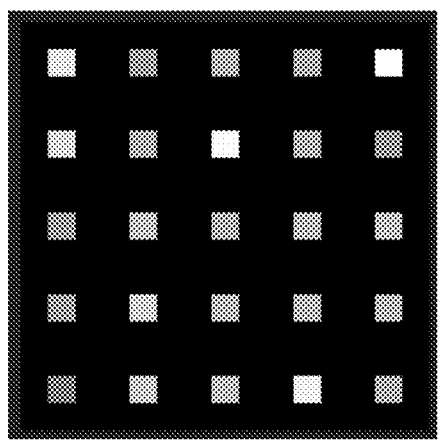
FIG. 6 illustrates a desired target light field of the second DOE to be designed by calculating in consideration of the actual light field distribution of the first DOE shown in FIG. 5.

When the second DOE is being designed, the actual light field distribution of the first DOE should be considered (as shown in FIG. 5). The design objective of the second DOE is no longer to have a uniform light splitting dot matrix, but to superimpose the light field distribution of the second DOE and the light field distribution of the first DOE to form a light splitting dot matrix light field having uniformly distributed light fields. For example, regarding a dot having lower light intensity in the light field distribution of the first DOE, the light intensity of the dot should be higher in the target light field diagram of the second DOE. Similarly, regarding a dot having higher light intensity in the light field distribution of the first DOE, the light intensity of the dot should be lower in the target light field diagram of the second DOE. As shown in FIG. 6, it schematically shows a target light field of the second DOE to be designed considering the actual light field distribution of the first DOE shown in FIG. 5. FIG. 3 shows the target light field of the DOE desired to be designed, and FIG. 5 shows the actual light field distribution of the first DOE as designed. Considering these two factors, a deviated light field distribution between them can be calculated, that is the target light field of the second DOE. For example, the light intensity of each light dot in the target light field can be normalized to 1, then the average light intensity of the actual light field of the first DOE can be calculated and normalized to 0.5, so as to obtain the normalized value of each light dot in the actual light field of the first DOE, and next the normalized value of each light dot of the first DOE calculated above is subtracted from 1 respectively, so as to obtain the normalized distribution data of the target light field of the second DOE. However, the present invention is not limited to this, and those skilled in the art can also calculate the target light field of the second DOE according to other methods, as long as the non-uniformity of the light field distribution of the first DOE can be compensated by designing the second DOE.

Figure 7:
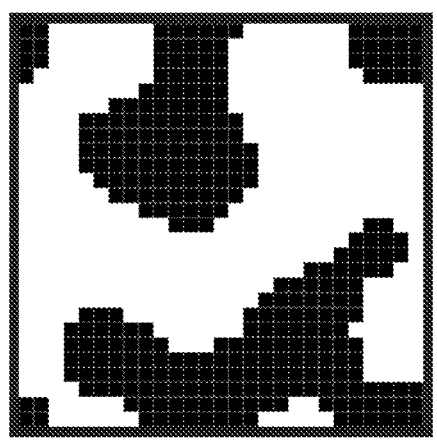
FIG. 7 illustrates a schematic diagram of the phase distribution of the second DOE designed according to the target light field of FIG. 6.

According to the target light field of the second DOE as shown in FIG. 6, the phase distribution of the second DOE can be calculated, and thereby the second DOE can be designed (manufactured). As shown in FIG. 7, it illustrates a schematic diagram of the phase distribution of the second DOE according to Example I. The phase distribution of DOE can be calculated by a scalar diffraction theory.

Figure 8:
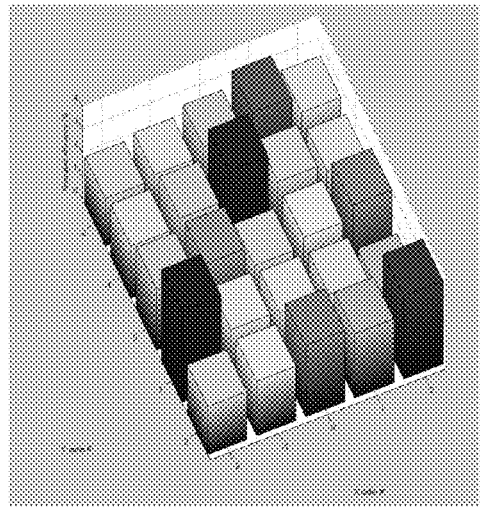
FIG. 8 illustrates a schematic diagram of the actual light field distribution of the second DOE designed according to the target light field of FIG. 6.

An actual light field distribution of the second DOE can be obtained by performing vector simulation on the phase distribution diagram of the second DOE, for example by employing Rigorous Coupled Wave Analysis (RCWA). However, the present invention is not limited to this, and the actual light field of the second DOE can also be obtained by producing and manufacturing the designed second DOE and then performing actual measurement. As shown in FIG. 8, it illustrates a schematic diagram of the actual light field distribution of the second DOE according to Example I.

Figure 9:
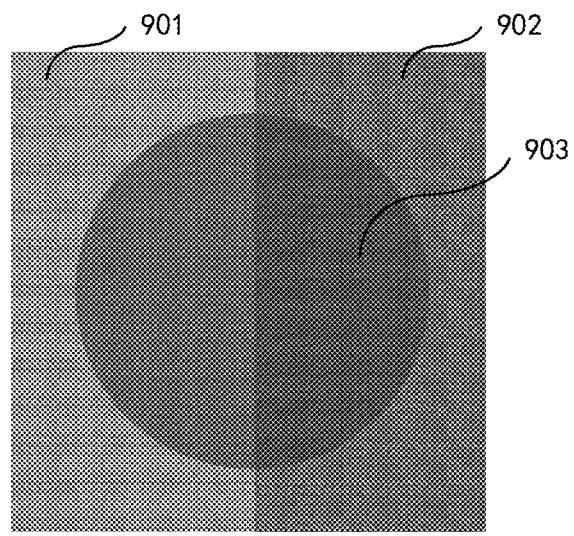
FIG. 9 illustrates a schematic diagram of a laser light source irradiating on a first diffractive optical assembly formed by combined use of the first DOE and the second DOE according to one embodiment of the present disclosure.

By combining the first DOE and the second DOE, the first DOE and the second DOE are combined to form a combined first diffractive optical assembly. As shown in FIG. 9, it illustrates a schematic diagram of a laser light source irradiating on the first diffractive optical assembly formed by combined use of the first DOE and the second DOE according to Example I. As shown in FIG. 9, a rectangle 901 in the left half represents the first DOE, a rectangle 902 in the right half represents the second DOE, and an irradiation area of the laser light source is shown by a circle 903. The combination mode of the first DOE and the second DOE as shown is left-to-right splicing. During use, a beam emitted by the laser light source needs to cover the first DOE and the second DOE. It should be understood that the DOE design method of the present disclosure is also feasible for any other possible combination of the first DOE and the second DOE, for example top-to-bottom splicing, front-to-rear stacking, etc. In addition, the first DOE and the second DOE can be processed and manufactured respectively, and then combined into the first diffractive optical assembly by means of left-to-right or top-to-bottom splicing, or the phase distribution structures of the first DOE and the second DOE can be processed respectively in the left and right or top and bottom portions of one and the same substrate, so as to integrally process or manufacture the first diffractive optical assembly.

Figure 10:
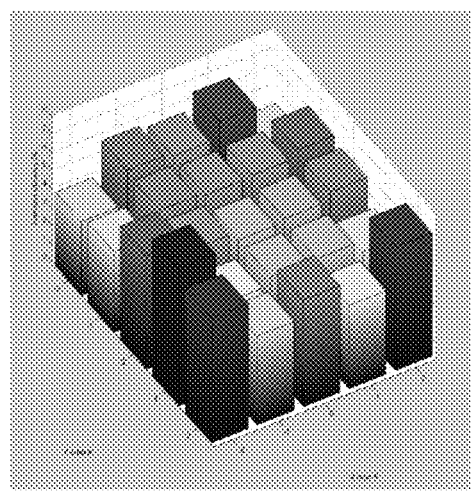
FIG. 10 illustrates a schematic diagram of the actual light field distribution of the first diffractive optical assembly shown in FIG. 9.

An actual light field distribution of the first diffractive optical assembly can be obtained by performing vector simulation on the first diffractive optical assembly formed by combining the first DOE and the second DOE, for example by employing Rigorous Coupled Wave Analysis (RCWA). However, the present invention is not limited to this, and the actual light field can also be obtained by producing and manufacturing the first diffractive optical assembly and then performing actual measurement. As shown in FIG. 10, it illustrates a schematic diagram of the actual light field distribution of the first diffractive optical assembly according to Example I.

It can be seen from FIG. 9 that the uniformity of the target light field has been greatly improved, and it is calculated that the uniformity error of the first diffractive optical assembly is reduced to about 30%.

Example II

On the basis of Example I, regarding the first diffractive optical assembly formed by combining the first DOE and the second DOE, a third DOE can be further designed, so that an actual light field distribution of a second diffractive optical assembly formed by combining the first DOE, the second DOE and the third DOE further approximates the target light field distribution.

When the third DOE is being designed, the actual light field distribution of the first diffractive optical assembly formed by combining the first DOE and the second DOE should be taken into consideration (as shown in FIG. 10). As shown in FIG. 11, it schematically shows a target light field of the third DOE to be designed considering the actual light field distribution of the first diffractive optical assembly shown in FIG. 10. FIG. 3 shows the target light field of the DOE desired to be designed, and FIG. 10 shows the actual light field distribution of the first diffractive optical assembly as designed. Considering these two factors, a deviated light field distribution between them can be calculated, that is, the target light field of the third DOE.

According to the target light field of the third DOE as shown in FIG. 11, the phase distribution of the third DOE can be calculated, and thereby the third DOE can be designed (manufactured). As shown in FIG. 12, it illustrates a schematic diagram of the phase distribution of the third DOE according to Example II. The phase distribution of DOE can be calculated by a scalar diffraction theory.

As shown in FIG. 13, it illustrates a schematic diagram of a laser light source irradiating on the second diffractive optical assembly formed by combined use of the first DOE, the second DOE and the third DOE according to Example II. As shown in FIG. 13, a trapezoid 1301 in the upper left portion represents the first DOE, a trapezoid 1302 in the upper right portion represents the second DOE, a pentagon 1303 in the lower portion represents the third DOE, and an irradiation area of the laser light source is shown by a circle 1304.

Figure 14:
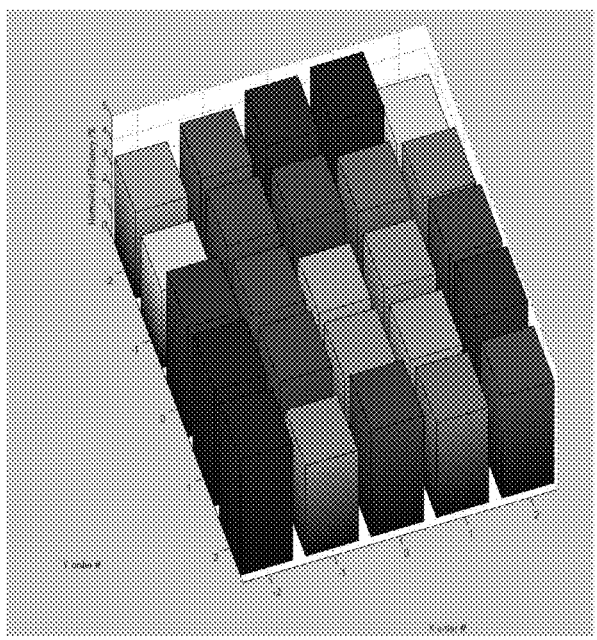
FIG. 14 illustrates a schematic diagram of the actual light field distribution of the second diffractive optical assembly shown in FIG. 13.

FIG. 14 shows the actual light field distribution (calculated by a simulation process) of the second diffractive optical assembly formed by combining the first DOE, the second DOE and the third DOE, and it is calculated that the uniformity error is reduced to about 21%.

Further, when a light spot irradiated on the DOE is large enough, the design solution of the diffractive optical assembly of the present disclosure can be further improved, and the final DOE may not be limited to two or three portions, but may be composed of more. Theoretically, the more the sub-DOEs, the better the uniformity of the final light field.

In the embodiments described above, the target light field may be a uniformly distributed dot matrix, and the light field difference may be a uniformity difference. However, it should be understood that the embodiments of the present disclosure are also applicable to a target light field in any other form and to other appropriate parameters for evaluating the light field uniformity.

In the embodiments described above, the diffraction pattern for describing the target light field is a two-dimensional dot matrix, but it should be understood that the target light field of a diffraction pattern in any other form is possible, and the embodiments of the present invention are not limited to the target light field of a two-dimensional dot matrix.

According to the embodiments of the present invention, the phase distribution diagram of the first diffractive optical element can be designed according to the scalar diffraction theory. According to the embodiments of the present invention, simulation can be performed on the first diffractive optical element according to the vector diffraction theory to obtain the first light field difference between the simulated light field of the first diffractive optical element and the target light field.

In another aspect of the present disclosure, it also provides a diffractive optical assembly, for example, as shown in FIG. 9, comprising a first diffractive optical element 901 and a second diffractive optical element 902 that are combined together, wherein the second diffractive optical element 902 is configured to at least partially compensate for a first light field difference between a light field of the first diffractive optical element 901 and a target light field of the diffractive optical assembly.

Further, the first diffractive optical element 901 is designed according to the target light field, and the second optical element 902 is designed according to the first light field difference between the light field of the first diffractive optical element and the target light field.

Further, as shown in FIG. 13, the diffractive optical assembly also comprises a third diffractive optical element designed according to a second light field difference between a superposition light field of the first diffractive optical element and the second diffractive optical element and the target light field.

Further, the diffractive optical assembly also comprises an $N^{th}$ diffractive optical element designed according to an $(N-1)^{th}$ light field difference between a superposition light field of the first to an $(N-1)^{th}$ diffractive optical element and the target light field, where N is a positive integer greater than or equal to 4.

Further, the target light field can be a uniform light splitting dot matrix, and the first light field difference is a uniformity difference.

Further, the second light field difference between the superposition light field of the first diffractive optical element and the second diffractive optical element and the target light field is less than the first light field difference.

Although the present invention has been described with reference to the currently considered embodiments, it should be appreciated that the present invention is not limited to the disclosed embodiments. On the contrary, the present invention is intended to cover various modifications and equivalent arrangements included in the spirit and scope of the appended claims. The scope of the following claims is in conformity with the broadest interpretation so as to include all of such modifications and equivalent structures and functions.

The contents described above are just preferred examples of the present disclosure, and are not used to limit the present disclosure. Although the detailed description of the present disclosure has been provided with reference to the foregoing examples, those skilled in the art may still make modifications to the technical solution as recited in each of the foregoing examples, or conduct equivalent replacement of some technical features therein. Any modification, equivalent replacement, or improvement, if only falling into the spirit and principles as stated herein, should be included in the protection scope of the present disclosure.

We claim:

1. A design method of a diffractive optical assembly, comprising:

designing a first diffractive optical element according to a target light field;

measuring or simulating the first diffractive optical element to obtain a first light field difference between a light field of the first diffractive optical element and the target light field; and calculating a second target light field according to the first light field difference and designing a second diffractive optical element according to the second target light field; and splicing and combining the first diffractive optical element and the second diffractive optical element to form a first diffractive optical assembly having a combined diffractive element, so that an incident light beam simultaneously covers the first diffractive optical element and the second diffractive optical element so as to compensate a non-uniformity of a light field distribution of the first diffractive optical element, wherein a second light field difference between a superposition light field of the first diffractive optical element and the second diffractive optical element and the target light field is less than the first light field difference.

2. The design method according to claim 1, further comprising:

measuring or simulating the first diffractive optical element and the second diffractive optical element to obtain the second light field difference between the superposition light field of the first diffractive optical element and the second diffractive optical element and the target light field;

designing a third diffractive optical element according to the second light field difference; and combining the first diffractive optical element, the second diffractive optical element and the third diffractive optical element to form a second diffractive optical assembly.

3. The design method according to claim 2, further comprising:

measuring or simulating the first to an $M^{th}$ diffractive optical element to obtain an $M^{th}$ light field difference between a superposition light field of the first to the $M^{th}$ diffractive optical element and the target light field;

designing an $(M+1)^{th}$ diffractive optical element according to the $M^{th}$ light field difference; and combining the first to the $(M+1)^{th}$ diffractive optical element to form an $M^{th}$ diffractive optical assembly, where M is a positive integer greater than 3.

4. The design method according to claim 1, wherein the target light field is a uniform light splitting dot matrix, and the first light field difference is a uniformity difference.

5. The design method according to claim 1, wherein the step of designing a first diffractive optical element comprises: designing a phase distribution diagram of the first diffractive optical element according to a scalar diffraction theory;

the step of measuring or simulating the first diffractive optical element comprises: simulating the first diffractive optical element according to a vector diffraction theory to obtain the first light field difference between a simulation light field of the first diffractive optical element and the target light field.

6. A diffractive optical assembly, comprising a first diffractive optical element and a second diffractive optical element as spliced and combined together to form a combined diffractive element so that an incident light beam simultaneously covers the first diffractive optical element and the second diffractive optical element, wherein the second diffractive optical element is configured to at least partially compensate for a first light field difference between a light field of the first diffractive optical element and a target light field of the diffractive optical assembly so as to compensate a non-uniformity of a light field distribution of the first diffractive optical element,
wherein a second light field difference between a superposition light field of the first diffractive optical element and the second diffractive optical element and the target light field is less than the first light field difference.

7. The diffractive optical assembly according to claim 6, wherein the first diffractive optical element is designed according to the target light field, and the second diffractive optical element is designed according to the first light field difference between the light field of the first diffractive optical element and the target light field.

8. The diffractive optical assembly according to claim 6, further comprising a third diffractive optical element designed according to the second light field difference between the superposition light field of the first diffractive optical element and the second diffractive optical element and the target light field.

9. The diffractive optical assembly according to claim 8, further comprising an $N^{th}$ diffractive optical element designed according to an $(N-1)^{th}$ light field difference between a superposition light field of the first to an $(N-1)^{th}$ diffractive optical elements and the target light field, where N is a positive integer greater than or equal to 4.

10. The diffractive optical assembly according to claim 6, wherein the target light field is a uniform light splitting dot matrix, and the first light field difference is a uniformity difference.

11. A diffractive optical assembly, obtained by:
designing a first diffractive optical element according to a first target light field and producing the first diffractive optical element;
measuring or simulating the first diffractive optical element to obtain a first light field difference between a light field of the first diffractive optical element and the first target light field;
calculating a second target light field according to the first light field difference, designing a second diffractive optical element according to the second target light field and producing the second diffractive optical element; and
splicing and combining the first diffractive optical element and the second diffractive optical element to form a combined diffractive element, so that an incident light beam simultaneously covers the first diffractive optical element and the second diffractive optical element so as to compensate a non-uniformity of a light field distribution of the first diffractive optical element,
wherein a second light field difference between a superposition light field of the first diffractive optical element and the second diffractive optical element and the target light field is less than the first light field difference.

12. The diffractive optical assembly according to claim 11, wherein the diffractive optical assembly is obtained further by:
measuring or simulating the first diffractive optical element and the second diffractive optical element to obtain the second light field difference between the superposition light field of the first diffractive optical element and the second diffractive optical element and the target light field;
designing a third diffractive optical element according to the second light field difference and producing the third diffractive optical element; and
combining the first diffractive optical element, the second diffractive optical element and the third diffractive optical element.

13. The design method according to claim 12, wherein the diffractive optical assembly is obtained further by:
measuring or simulating the first to an Mth diffractive optical element to obtain an Mth light field difference between a superposition light field of the first to the Mth diffractive optical element and the target light field;
designing an (M+1)th diffractive optical element according to the Mth light field difference and producing an (M+1)th diffractive optical element;
combining the first to the (M+1)th diffractive optical element,
where M is a positive integer greater than 3.

14. The design method according to claim 11, wherein the target light field is a uniform light splitting dot matrix, and the first light field difference is a uniformity difference.

15. The design method according to claim 11, wherein the operation of designing a first diffractive optical element is performed by: designing a phase distribution diagram of the first diffractive optical element according to a scalar diffraction theory;
the operation of measuring or simulating the first diffractive optical element is performed by: simulating the first diffractive optical element according to a vector diffraction theory to obtain the first light field difference between a simulation light field of the first diffractive optical element and the target light field.

* * * * *